United States Patent

[11] 3,539,026

| [72] | Inventors | Wayne N. Sutliff and<br>Jim L. Downen, both of 2931 Pierce Road,<br>Bakersfield, California 93300 |
|---|---|---|
| [21] | Appl. No. | 814,128 |
| [22] | Filed | April 7, 1969 |
| [45] | Patented | Nov. 10, 1970 |

[54] FISHING TOOL ENERGIZER
1 Claim, 5 Drawing Figs.

| [52] | U.S. Cl. | 175/299 |
| [51] | Int. Cl. | E21b 1/10 |
| [50] | Field of Search | 175/299 |

[56] References Cited
UNITED STATES PATENTS

| 2,146,454 | 2/1939 | Sutliff | 175/299 |
| 2,978,048 | 4/1961 | Walker | 175/299 |
| 3,343,606 | 9/1967 | Dollison | 175/299 |

*Primary Examiner*—James A. Leppink
*Attorney*—Dana E. Keech

ABSTRACT: A deep well elastic-tensile energy storage tool provided for incorporation in a drill string just above a fishing tool assembly, the latter embracing a fishing tool, a conventional jar and one or more drill collars, in the order named; said energy storage tool incorporating a co-axial stack of dished washer springs assembled in pairs alternately reversed in back-to-back and face-to-face relation, linear tension applied to said drill string elongating said energy storage tool and compressing said springs, the energy thus stored in said spring stack causing a rapid upward acceleration of said drill collars incident to the tripping of the jar, thereby delivering a sharp upward blow through said jar to said fishing tool.

Patented Nov. 10, 1970
3,539,026
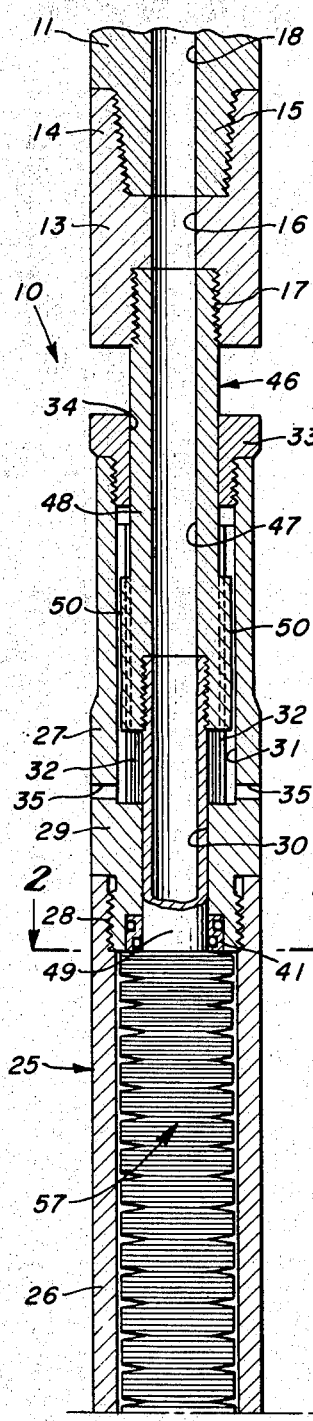
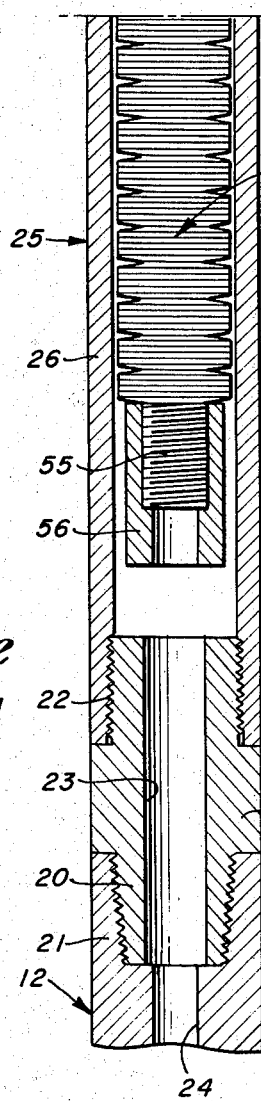
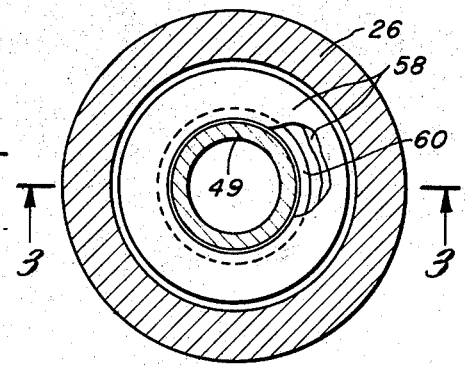
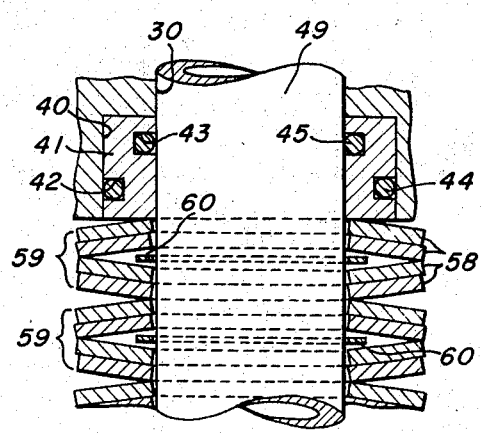
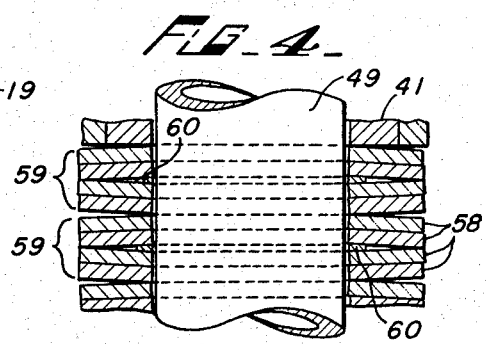
INVENTORS.
WAYNE N. SUTLIFF
JIM L. DOWNEN
BY.
ATTORNEY.

FISHING TOOL ENERGIZER

BACKGROUND OF THE INVENTION

The present invention is an improvement on the fishing tool energizer disclosed in our copending U.S. Pat. application Ser. No. 702,876 filed Feb. 5, 1968 now U.S. Pat. No. 3,472,326. In the aforesaid prior invention, a tandem series of independent coil springs was used for the tensile energy storage media, each of the coil springs being compressed by the total amount of the extension of the tool so as to obtain a relatively high degree of spring tension with a relatively short extension of the tool and do this without undue enlargement of the diameter of the tool.

Difficulty was experienced with the coil spring arrangement aforementioned in modifying this in the field to increase or decrease the quantity of energy required to be stored in the energizer to adapt the same to a particular fishing operation. It was in pursuit of a solution to this problem that the fishing tool energizer of the present invention was conceived.

SUMMARY OF THE INVENTION

It is an object of the present invention to provide a fishing tool energizer employing a coaxial dished washer spring stack for the energy storage medium which is readily adjustable in the field so as to vary the energy storage capacity of the tool from a relatively low tension capacity to a relatively high tension capacity.

It is a further object of the invention to provide such a fishing tool energizer in which the same parts are used in the tool for the various adjustments to modify the tension necessarily stored in the tool by its use, each adjustment being effected merely by changing the arrangement of the parts.

A further object of the invention is to provide such a fishing tool energizer in which abuse of the tool by accidental overtensioning of the spring stack therein is prevented by a positive means for limiting the tensioning of said stack to just that point which it is designed to stand.

BRIEF DESCRIPTION OF THE DRAWINGS

FIGS. 1A and 1B comprise a composite vertical sectional view of a preferred embodiment of the invention and show the same partially telescopically extended as during the conduit of a jarring operation by the drill string with which the tool is associated.

FIG. 2 is an enlarged cross-sectional view taken on the line 2-2 of FIG. 1A.

FIG. 3 is a still further enlarged vertical fragmentary sectional view taken on the line 3-3 of FIG. 2 and illustrates the individual dished washer springs of the spring stack of the present invention with said springs only partially tensioned.

FIG. 4 is a fragmentary detailed view similar to FIG. 3 showing the washer springs of the spring stack of the present invention tensioned with the maximum degree possible in the present invention and which is a degree of tensioning which will not damage said springs, and shows the deflection of said springs halted with their arrival at said degree of flexing.

DESCRIPTION OF THE PREFERRED EMBODIMENT

Referring specifically to the drawings, the invention is there illustrated as incorporated in a fishing tool energizer 10 which is secured, at its upper end, to the lower end of a drill string 11, said energizer having suspended from the lower end thereof a fishing tool assembly 12.

The energizer 10 includes an upper sub 13 provided at its upper end with a pin box 14 for receiving a pin 15 provided on the lower end of drill string 11. The sub 13 also includes a central passage 16 having a counterbore at its lower end provided with threads 17. The central passage 16 connects with an axial drilling fluid passage 18 provided in the drill string 11. The tool also includes a lower sub 19 having a lower pin end 20 which screws into a pin box 21 provided at the upper end of the fishing tool assembly 12. The upper end portion of lower sub 19 is turned down and provided with external threads 22. This sub has a circulating fluid passage 23 which connects with a fluid passage 24 provided in fishing tool assembly 12.

The energizer 10 also includes a tubular outer mandrel 25 which embraces a tubular spring housing 26 and a tubular spline housing 27. The spring housing 26 has internal threads at its lower end which screw onto the external threads 22 of the lower sub 19 and is also internally threaded at its upper end to screw onto external threads 28 of a head 29 provided on the lower end of spline housing 27. The head 29 is provided with an axial bore 30 having a counterbore 31 which extends from the head 29 to the opposite end of spline housing 27. Slots are milled from the face of the counterbore 31 to provide outer splines 32. The upper end of counterbore 31 is threaded to receive a threaded plug 33 comprising the upper head of spline housing 27.

Plug 33 has a bore 34. Just above the lower end of counterbore 31 the spline housing 27 is provided with series of radial ports 35 to allow free circulation of the surrounding well fluid to and from the spline chamber within spline housing 27. The lower end of bore 30 of head 29 has a counterbore 40 for accommodating a metal seal ring 41 having external and internal annular grooves 42 and 43 for receiving O-rings 44 and 45.

The fishing tool energizer 10 also includes a tubular inner mandrel 46 which has an internal bore 47 extending throughout its length for the transmission of circulating fluid, said mandrel including a relatively heavy spline section 48 at its upper end and a relatively light and considerably longer spring mounting tubular section 49 at its lower end. The spline section 48 is provided with radial inner splines 50 which mesh with outer splines 32. A lower end portion of the bore 47 in spline section 48 is counterbored and threaded so that an externally threaded upper end portion of spring mounting inner mandrel section 49 may screw into said counterbore to unite sections 48 and 49. From the inner splines 50 to the upper end of spline section 48 and latter is cylindrical and slidably fits the bore 34 in threaded plug 33, the upper extremity of section 48 being externally threaded and is screwed into threads 17 in the counterbore of the upper sub 13. The light spring mounting section 49 of the inner mandrel slidably fits the bore 30 of the spline housing head 29 and extends downwardly in outer mandrel spring housing section 26 to within a short distance of sub 19. The lower portion of spring mounting section 49 is provided with external threads 55 on which a stop nut 56 is adapted to be screwed.

The stop nut 56 is provided for trapping on the inner mandrel spring mounting section 49, between said nut and the lower spline housing head 29, a stack 57 of dished washer springs 58 so that when the tool 10 is in its normal retracted condition in which the spline section 48 of the inner mandrel rests against the lower spline housing head 29, the spring stack 57 is already subjected to a substantial distortion produced by compressing said stack between the nut 56 and the head 29. Thus, any extension which takes place in the tool 10 as illustrated in FIG. 1A and FIG. 1B adds substantially to the compression which the stack 57 is already subjected to and stores up a very substantial total force within said spring stack tending to return the tool 10 to its fully retracted condition the instant said tool is released.

The preferred arrangement of the individual washer springs 58 in the stack 57 is to dispose the springs in the stack in a series of like groups 59 which are placed together end-to-end in the stack, each group including at least one spring disposed in the bottom half of the group and with the dished face thereof facing upwardly and at least one superposed spring in the upper half of the group with its dished face facing downwardly. There may be only one lower spring in each such group and only one upper spring but there is always an equal number of springs thus opposed to each other in each of said groups and all of the groups are always alike in the number of springs embodied therein.

The optimum arrangement in general use in the tool 10 in the oil fields is to employ two lower washer springs in each group and two upper washer springs in said group as illustrated in the drawings. In certain instances in the oil fields, it is desirable to use a lesser force than that which will be provided in the operation of the tool by the arrangement shown in the drawings and in such a case the tool may be readily disassembled in the field and the individual washer springs in the stack 57 rearranged therein so that only a single pair of springs 58 are included in each of the aforementioned groups 59 which are assembled to make up the stack.

On the other hand, where an especially powerful blow is desired to be struck through use of the energizer 10 the dished washer springs 58 in the stack 57 are reassembled before using the tool so that there are three lower springs and three upper springs in each group 59 of the series of these which are put together end-to-end to form the stack 57. In other words, this would make six rings in each group, the upper three being faced downwardly and the lower three faced upwardly in opposition to the upper three.

The facility with which variation may be effected in the power which the tool 10 is able to apply in striking a jarring blow in a fishing operation and which can be made use of without any change in the parts of the tool but merely by rearrangement of the parts embodied in it is of great practical significance in the oil producing industry.

The invention also embraces a means which is adapted for use in all of the various alternate ways in which the dished washer springs 58 may be assembled in the stack 57, to limit the degree of distortion to which the springs 58 may be subjected so that all such uses of the tool 10 will be rendered fool proof against over-compression of the springs 58 such as might damage these and require their replacement. This facility is afforded by the provision of limit stop rings 60 which slidably surround the spring mounting section 49 of the inner mandrel of the tool and are placed, in the assembly of the stack 57, regardless of the arrangement of the springs in the stack, so that one of these limit stop rings is located in the space interval between the upper springs 58 and the lower springs 58 in each of the groups 59 of these springs into which the stack 57 is divided. The action of the limit stop rings 60 is clearly illustrated in FIGS. 3 and 4 which shows the springs 58 of stack 57 as they are related at the beginning of a tool tensioning movement and at the conclusion of this movement where further distortion of the springs 58 is rendered impossible by the innermost pair of washer springs in each group 59 being clamped against the limit spacer ring 60 disposed between said springs. The compression of springs 58 is thus preferably limited to 80 percent of their complete compression.

With four springs 58 in each group 59 and using sixty-nine groups, a linear expansive force of fourteen tons is produced in the tool when the latter is extended as shown in FIG. 4. With six springs in each group 59, a linear expansive force of 21 tons is produced. This is speaking of a tool 10 which is 3-½ inches in diameter and which is normally run with a conventional hydraulic jar of the same diameter.

We claim:
1. A fishing tool assembly energizer comprising:
an upper sub;
a lower sub;
a tubular outer mandrel connected to said lower sub and extending upwardly therefrom;
a tubular spline housing having a centrally bored head at its lower end, and an internally splined counter bore extending upwardly therefrom, the upper end of said outer mandrel threadedly connecting with said head, said spline housing having a centrally bored threaded plug in its upper end;
a tubular inner mandrel including;
a heavy spline section which connects to said upper sub, slideably extends down through said plug and has male splines meshing with the internally splined counter bore of said spline housing;
a light tubular section extending downwardly from said spline section and slideably through the bore in said spline housing head;
a stack of dished washer springs co-axially slideable on said light tubular section below said spline housing head; and
a nut screwed onto the lower end of said light tubular inner mandrel section compressing said stack upwardly against said spline housing head when said heavy inner mandrel spline section rests downwardly against said spline housing head.